United States Patent [19]

Marino

[11] 3,985,054

[45] Oct. 12, 1976

[54] CUTTING MECHANISM

[75] Inventor: Salvatore M. Marino, East Brunswick, N.J.

[73] Assignee: Fedders Corporation, Edison, N.J.

[22] Filed: June 23, 1975

[21] Appl. No.: 589,443

[52] U.S. Cl. .................................. 83/303; 83/345; 83/339; 83/37; 74/409
[51] Int. Cl.² ..................... B26D 1/56; B23D 25/12
[58] Field of Search .................. 74/409; 83/37, 345, 83/339, 348, 303

[56] References Cited
UNITED STATES PATENTS

| 2,221,022 | 11/1940 | Ellis | 83/345 X |
| 3,006,215 | 10/1961 | Musser | 74/409 X |
| 3,583,267 | 6/1971 | Topolski et al. | 83/345 X |

FOREIGN PATENTS OR APPLICATIONS

| 596,644 | 5/1934 | Germany | 83/345 |

*Primary Examiner*—Donald R. Schran
*Attorney, Agent, or Firm*—McAulay, Fields, Fisher & Goldstein

[57] ABSTRACT

The cutting mechanism comprises a driving shaft and a driven shaft. A motor is connected to the driving shaft and rotates the driving shaft in a first direction. A gearing arrangement interconnects the driving and the driven shafts so that rotation of the driving shaft causes concomitant rotation of the driven shaft in a direction opposite to the first direction. Coacting cutting means are provided on the driving and the driven shafts for cutting material received therebetween. A motor is connected to the driven shaft and rotates the driven shaft in a direction opposite to the normal direction of rotation of the driven shaft to eliminate backlash between the coacting gears. Thus, the clearance between the cutting edges of the rotary cutting means is always constant and uniform.

5 Claims, 2 Drawing Figures

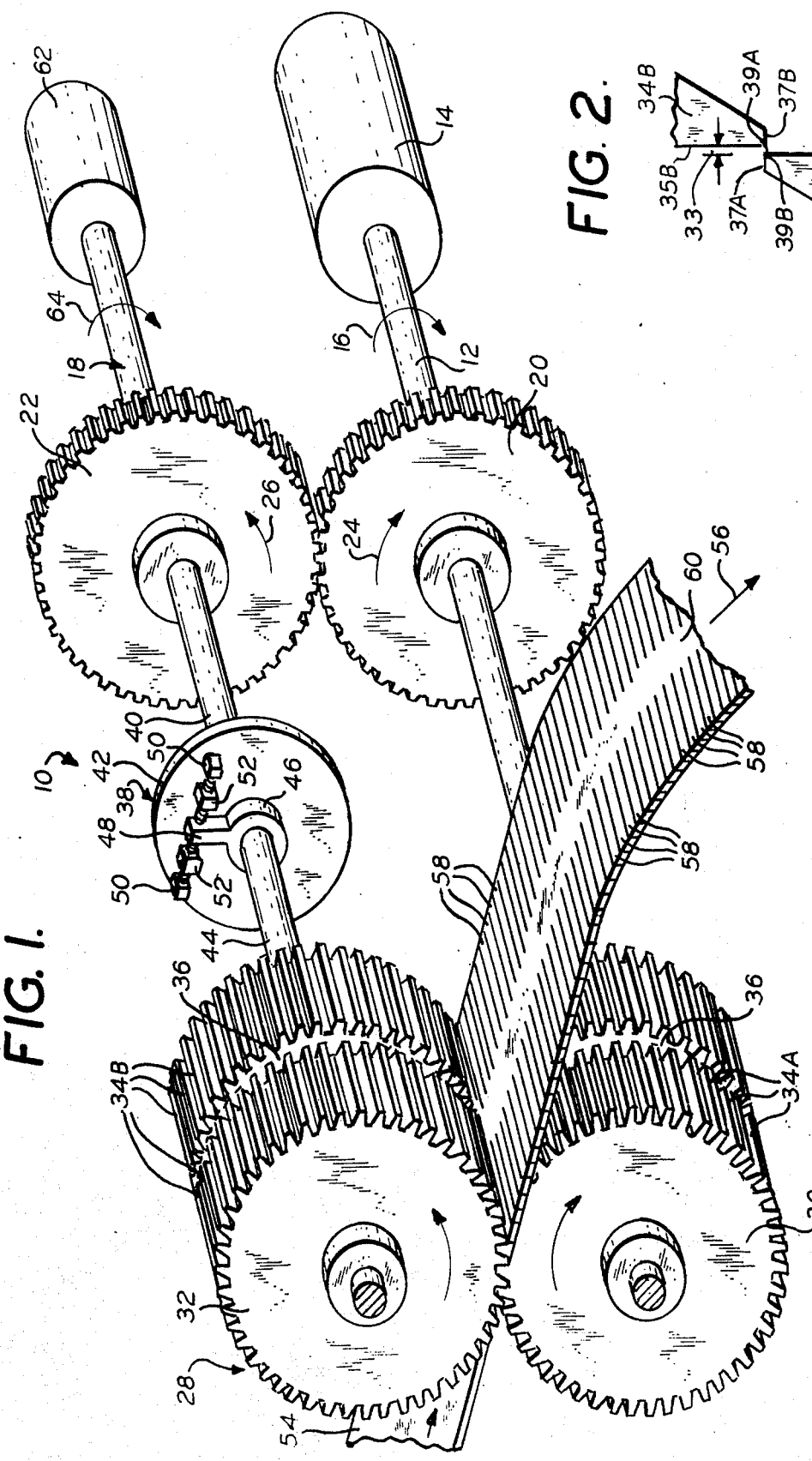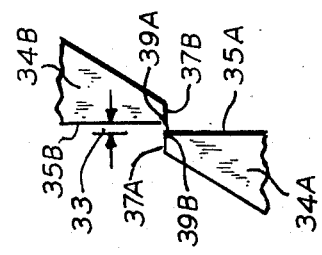

CUTTING MECHANISM

The present invention relates to a cutting mechanism and, in particular, pertains to a cutting mechanism that accurately produces fins of substantially the same widths from sheet metal.

For many applications, sheet metal is cut or sheared by rotating cutters that pierce or cut the sheet of material as it passes therebetween. In other words, the rotational movement of the cutters causes the sheet metal to move past the cutters as the cutters actually cut the material. However, a major problem arises particularly in those cases where the metal to be cut is relatively thin. To be more specific, in cutting arrangements of the type under consideration, the clearance between the cutting edges of the cutters is usually 10% of the thickness of the metal being cut. If the metal being cut is very thin, such as 0.007 inches, the clearance between edges would have to be substantially 0.0007 inches. This is an extremely small tolerance to maintain. At present, conventional gears, or, for that matter, so-called anti-blacklash gears have a degree of backlash that far exceeds 0.0007 inches. Thus, if these conventional systems are used to cut metal of the thickness under consideration, the edges of the cutters will engage each other thereby destroying their sharp edges.

Accordingly, an object of the present invention is to provide an improved cutting mechanism.

A more specific object of the present invention is to provide a cutting mechanism that produces accurate cuts in sheet metal or the like.

A further object of the present invention is to provide a cutting mechanism that provides evenly spaced cuts in relatively thin sheets of material is an efficient and reliable manner.

A further object of the present invention resides in the novel details of construction that provide a cutting mechanism of type described in which backlash is eliminated and wherein the mechanism may easily be adjusted to accommodate relatively thin sheet metal.

Accordingly, a cutting mechanism constructed in accordance with the present invention comprises a driving shaft and motor for rotating the driving shaft in a first direction. A driven shaft is provided and gearing means is connected between the driving and the driven shafts for rotating the driven shaft in a direction opposite to the first direction. Coacting cutting means are provided on the driving and the driven shafts for cutting material received therebetween. Additionally, rotating means is connected to the driven shaft for rotating the driven shaft in the first direction thereby applying a constant reverse torque to the driven shaft to eliminate backlash.

A feature of the present invention is the provision of a method for accurately producing spaced cuts of constant width in sheet material.

Other features and advantages of the present invention will become more apparent from a consideration of the following detailed description when taken in conjunction with the accompanying drawing, in which:

FIG. 1 is a perspective view of a cutting mechanism constructed according to the present invention; and FIG. 2 is a detailed view, to enlarged scale, of adjacent cutter teeth.

A cutting mechanism constructed according to the present invention is designated generally by the reference character 10 in FIG. 1 and comprises a driving shaft 12. (It should be noted that in the interests of clarity, bearing supports, frame supports, etc., have not been shown as these are conventional.) The shaft 12 is connected to a motor 14 that rotates the shaft in a clockwise direction as indicated by the arrowhead 16 in FIG. 1. Additionally, a driven shaft 18 is provided. Affixed to the shaft 12 is a gear 20 that is in meshing engagement with a gear 22 that is affixed to the shaft 18. The gears 20 and 22 function to transmit rotation from the driving shaft 12 to the driven shaft 18. That is, the gear 20 will rotate in the clockwise direction as indicated by the arrowhead 24 and will thereby drive the gear 22 in the counterclockwise direction as indicated by the arrowhead 26, thereby causing the shaft 18 to likewise rotate in counterclockwise direction or in a direction opposite to the direction of rotation of the shaft 12.

Affixed to the ends of the shafts 12 and 18 are cutting means designated generally by the reference character 28. More specifically, the cutting means 28 comprises a cutter 30 that is affixed to the shaft 12 and is in meshing engagement with a cutter 32 that is affixed to the shaft 18. The cutters 30 and 32 respectively rotate in the clockwise and counterclockwise directions and are provided with circumferentially spaced cutting teeth 34A and 34B, respectively. Additionally, the cutters are provided with a recessed circumferential center portion 36.

FIG. 2 illustrates the relationship between adjacent meshing teeth of the cutters 30 and 32. Thus, the forward edges 35A and 35B of the respective teeth 34A and 34B are straight and terminate at transverse edges 37A and 37B to form respective cutting edges 39A and 39B. The rear edges 41A and 41B of the respective teeth are tapered. The space 33 between the teeth represents the clearance or gap between teeth.

In the operation of the mechanism thus far described, a sheet of material 54, such as sheet metal or the like, is fed between the cutters 30 and 32. The rotation of the cutters causes the material 54 to move in the direction of the arrowhead 56. As the sheet moves between the teeth, the meshing teeth cut or shear the sheet thereby to form outwardly extending fingers 58 which are connected to a medial or center portion 60. Subsequently, the cut sheet may be folded to form a coolant tube with the fingers 58 forming cooling fins along the length of the tubing.

The spacing between the meshing teeth of the gears 20 and 22 produces a substantial play or backlash between the gears. As a result, the gears tend to move relative to each other thereby causing a concomitant movement between the teeth 34A and 34B which results in a variable spacing between the cuts in the sheet 54. In other words, the fins or fingers 58 which would thereby be formed would be of varying widths and thereby produce a less efficient cooling device. Moreover, and of greater importance, where the clearance 33 is relatively small, the cutting edges of the teeth on the cutters may engage or ride upon each other thereby destroying their fine cutting edges. However, in accordance with the present invention, a motor 62 is provided which is connected to the end of the shaft 18 opposite the cutter 32. The motor 62 applies a torque to the shaft which would tend to rotate the shaft in the clockwise direction as indicated by the arrowhead 64. In others words, the motor 62 would tend to rotate the shaft 18 in the same direction that the motor 14 rotates the shaft 12. This effectively applies a reverse or counter-rotative force to the shaft 18 which eliminates backlash.

In practice, the motor 62 and the motor 14 may be hydraulic motors or pneumatic motors or, for that matter, DC motors which are supplied by varying voltages. The important consideration is that the motor 62 must be permitted to slip to accommodate the actual direction of rotation of the shaft 18 under influence of the driving train comprising gears 20 and 22. Additionally, the rotational force produced by the motor 62 must be greater than the shearing force produced by the cutting teeth on the cutters 30 and 32. Additionally, the force produced by the motor 14 must obviously be greater than the force produced by the motor 62.

An adjusting device designated generally by the reference character 38 is provided to adjust the spacing between the meshing teeth on the cutters 30 and 32. More specifically, the shaft 18 comprises a section 40 that mounts the gear 22 thereon and is affixed to a coupling plate 42 of the device 38. The shaft 18 further comprises a shaft section 44 that mounts the cutter 32 thereon and is affixed in the member 46 that is rotatable on the coupling plate 42. The member 46 includes a radially extending arm 48, the position of which is determined by adjusting screws 50 which are threadedly received in posts 52 on the plate 42. That is, by rotating one screw 50 relative to the other, the arm 48 and, therefore, the angular position of the shaft section 44 may be moved relative to the shaft section 40. As a result, the spacing between the cutting edges of the teeth 34A and 34B may be varied to accommodate different thicknesses of material. It is to be understood, of course, that once the cutter 32 has been rotated relative to the cutter 30 to obtain the desired spacing between teeth for the thickness of material under consideration, the screws 30 are moved axially until they abut the arm 48 of the member 46 to maintain the cutter 32 in the desired orientation. Since the backlash is eliminated by the motor 62, the clearance or gap 33 determined by the setting of the adjusting device 38 will therefore remain constant and uniform.

Accordingly, a cutting mechanism has been described which is simple in operation and which produces accurate and uniform spaced cuts in a sheet of metal.

While a preferred embodiment of the invention has been shown and described herein, it will become obvious that numerous omissions, changes and additions may be made in such embodiment without departing from the spirit and scope of the present invention.

What is claimed is:

1. A cutting mechanism comprising, in combination: a driving shaft, a first motor for applying a torque to said driving shaft in a direction to rotate said driving shaft in a first direction, a driven shaft, gearing means between said driving and driven shafts for rotating said driven shaft in a direction opposite to said first direction, coacting cutting means on said driving and driven shafts for cutting material received therebetween, and a second motor connected to said driven shaft for continuously applying a torque thereto in a direction which tends to rotate said driven shaft in said first direction, said cutting means comprising coacting toothed cutters on said driving and driven shafts for shearing material received therebetween, said torque produced by said second motor having a magnitude such that the rotational force on said driven shaft due to said second motor is greater than the shearing force between the teeth on said cutters, and the torque produced by said first motor is greater than the torque produced by said second motor, said driven shaft comprising a first section connected to said rotating means, and a second section connected to one of said cutters, and adjusting means comprising an adjustable coupling between said first and second sections for releasably connecting said first section to said second section, whereby said second section may be rotated relative to said first section upon release of said coupling.

2. A cutting mechanism as in claim 1, in which said second motor comprises a hydraulic motor.

3. A cutting mechanism as in claim 1, in which said second motor comprises a motor capable of slipping.

4. A cutting mechanism as in claim 1, in which said second motor comprises a pneumatic motor.

5. A cutting mechanism as in claim 1, in which said cutters each comprise: a plurality of teeth circumferentially spaced about said cutters, and a recessed circumferential center portion whereby said cutters produce a cutting pattern having outwardly extending fins connected to a longitudinally extending medial portion.

* * * * *